United States Patent [19]

Takahashi

[11] 4,237,037

[45] Dec. 2, 1980

[54] POWDER COATING COMPOSITION COMPOSED OF ETHYLENE RESIN MIXTURE AND HYDROCARBON WAX

[75] Inventor: Takao Takahashi, Iwakuni, Japan

[73] Assignee: Mitsui Petrochemical Industries Ltd., Tokyo, Japan

[21] Appl. No.: 26,699

[22] Filed: Apr. 3, 1979

[30] Foreign Application Priority Data

Apr. 7, 1978 [JP] Japan .................................. 53/40217

[51] Int. Cl.$^3$ .............................................. C08L 23/08
[52] U.S. Cl. ........................ 260/28.5 AV; 260/28.5 A; 525/57; 525/70; 525/74; 525/78; 525/79; 525/80; 525/284; 525/301
[58] Field of Search ................. 260/28.5 A, 28.5 AV; 525/57, 78, 79, 80, 74, 284, 301, 70

[56] References Cited

U.S. PATENT DOCUMENTS 4,046,728  9/1977  Harmuth ......................... 260/28.5 A Primary Examiner—Melvyn I. Marquis Attorney, Agent, or Firm—Sherman & Shalloway

[57] ABSTRACT

A powder coating composition comprising
(A) 70 to 97% by weight of an ethylene resin mixture composed of
  (A-1) an ethylene copolymer having a melt index of 1 to 50 and containing at least one comonomer selected from the group consisting of alpha-olefins other than ethylene, dienes, vinyl acetate, vinyl alcohol, acrylic acid, functional derivatives of acrylic acid, methacrylic acid and functional derivatives of methacrylic acid, and
  (A-2) a graft copolymer of polyethylene having grafted thereto an unsaturated carboxylic component, the amount of said unsaturated carboxylic component being 0.001 to 2% based on the weight of the ethylene resin mixture (A), and
(B) 3 to 30% by weight of a hydrocarbon wax having a number average molecular weight of about 400 to about 3,000 and a density of not less than 0.9 g/cm$^3$, said wax having an acid value of up to about 5 when it is a modified wax.

8 Claims, No Drawings

POWDER COATING COMPOSITION COMPOSED OF ETHYLENE RESIN MIXTURE AND HYDROCARBON WAX

This invention relates to a powder coating composition for use in coating metal substrates by fluidized bed coating, electrostatic spray coating and the like, which is composed of a major proportion of an ethylene resin mixture and a minor proportion of a hydrocarbon wax. More specifically, this invention pertains to a powder coating composition which gives a coated film having good adhesion to substrates, and also exhibiting improved smoothness and stress cracking resistance which do not normally stand together in a powder coating composition of the ethylene resin type.

In particular, the present invention relates to a powder coating composition comprising (A) 70 to 97% by weight of an ethylene resin mixture composed of
 (A-1) an ethylene copolymer having a melt index of 1 to 50 and containing at least one comonomer selected from the group consisting of alpha-olefins other than ethylene, dienes, vinyl acetate, vinyl alcohol, acrylic acid, functional derivatives of acrylic acid, methacrylic acid and functional derivatives of methacrylic acid, and
 (A-2) a graft copolymer of polyethylene having grafted thereto an unsaturated carboxylic component, the amount of said unsaturated carboxylic component being 0.001 to 2% based on the weight of the ethylene resin mixture, and (B) 3 to 30% by weight of a hydrocarbon wax having a number average molecular weight of about 400 to about 3,000 and a density of not less than 0.9 g/cm$^3$, said wax having an acid value of up to about 5 when it is a modified wax.

Various resins are utilized for use in "powder coating" by an electrostatic powder coating process which comprises spraying an electrostatically charged resin powder composition onto a substrate by utilizing an electrostatic attracting force to adhere the powder composition electrostatically onto the surface of the substrate, and melting the resin to form a coated film on the substrate surface, or a fluidized bed coating process which comprises immersing a heated substrate in a fluidized bed of a resin powder composition to form a coated film on the surface of the substrate. Powder coating compositions comprising an ethylene resin typified by polyethylene as a resin component have begun to gain acceptance for coating of iron or steel pipes used in city water service facilities and for powder coating of various metal substrates because of their desirable properties, such as superior safety for food sanitation, superior low temperature resistance and impact resistance and good chemical resistance.

Resins utilized in such powder coating compositions are required to have a good melt flow, permit the formation of a smooth coated film of uniform thickness, and give a coated film having good adhesion to substrates and good stress cracking resistance. However, generally, in powder coating compositions of the ethylene resin type, the use of a resin having a good flow at the time of melting results in an unnegligible decrease in stress cracking resistance, and an attempt to provide a good flow by increasing the amounts of a lubricant and other additives frequently aggravates adhesion to substrates. It has been difficult therefore to provide a powder coating composition which can afford a coated film having good smoothness, stress cracking resistance and adhesion to a substrate without sacrificing the desirable properties of the ethylene resin.

It has previously been known that a graft copolymer resulting from the grafting of an unsaturated carboxylic acid or a functional derivative thereof to an ethylene polymer increases adhesion to substrates. As a powder coating composition utilizing such a graft copolymer, U.S. Pat. No. 3,932,368 suggested a composition composed of a particulate form of a carboxylated polyolefin selected from the group consisting of carboxylated polyethylene compositions having a melt index of 5 to 75 at 190° C. and carboxylated homo- and copoly-alpha-olefins prepared from alpha-olefin monomers containing 3 to 12 carbon atoms and copolymers of such monomers and ethylene. The carboxylated polyolefins contain small amounts of unsaturated dicarboxylic component, with or without minor amounts of other unsaturated acid materials, which are grafted onto normally solid polyolefins. The powder coating composition may further contain additives such as stabilizers, pigments, fillers and the like.

The U.S. Pat. No. 3,932,368 does not at all state the use of the hydrocarbon wax component which is an essential ingredient (B) in the powder coating composition of the present invention. A powder coating composition capable of giving a coated film having good adhesion to the substrate, and satisfactory smoothness and stress crack resistance in a well balanced state cannot be provided by the technique of the cited U.S. Patent, as will be seen from a comparative example given hereinbelow.

The present inventors made investigations in an attempt to solve the aforesaid technical problems in powder coating compositions of the ethylene resin type.

These investigations have led to the discovery that a powdery composition composed of a specified amount of (A) an ethylene resin mixture consisting of (A-1) a specified ethylene copolymer and (A-2) a specified graft copolymer of polyethylene and a specified amount of (B) a specified hydrocarbon wax, and which may further contain additives shows markedly improved properties as a powder coating composition used by a powder coating means such as fluidized bed coating, and electrostatic spraying method. It has also been found that a superior powder coating composition having a well balanced combination of good adhesion to substrates and satisfactory smoothness and stress cracking resistance in the resulting coated films can be provided by the present invention.

It is an object of this invention therefore to provide a powder coating composition for coating of metal substrates having the aforesaid improved properties.

The above and other objects of this invention and advantages will become more apparent from the following description.

The powder composition of this invention is composed of (A) the ethylene resin mixture consisting of (A-1) the ethylene copolymer and (A-2) the graft copolymer of polyethylene and (B) the hydrocarbon wax.

The copolymer (A-1) is desirably a copolymer containing a major proportion, preferably at least 70 mole%, more preferably at least 90 mole%, of ethylene. Examples of the comonomer in the copolymer (1) include alpha-olefins other than ethylene, preferably alpha-olefins having 3 to 10 carbon atoms; dienes such as butadiene, isoprene, 1,4-hexadiene, ethylidene norbornene and cyclopentadiene; vinyl acetate; vinyl alcohol; acrylic acid, functional derivatives of acrylic acid, for example $C_1$–$C_8$ alkylesters of acrylic acid such as methyl acrylate, ethyl acrylate, n-butyl acrylate and isobutyl acrylate; methacrylic acid; functional derivatives of methacrylic acid, for example, $C_1$–$C_8$ alkyl esters of methacrylic acid such as methyl methacrylate, butyl methacrylate and glycidyl methacrylate. These comonomers can be used either singly or as a mixture of at least one.

Examples of the ethylene copolymer (A-1) are an ethylene/propylene copolymer, an ethylene/1-butene copolymer, an ethylene/1-pentene copolymer, an ethylene/1-hexene copolymer, an ethylene/4-methyl-1-pentene copolymer, an ethylene/butadiene copolymer, an ethylene/propylene dicyclopentadiene copolymer, an ethylene/propylene/ethylidene norbornene copolymer, an ethylene/vinyl acetate copolymer, an ethylene/vinyl alcohol copolymer, an ethylene/acrylic acid copolymer, an ethylene/acrylate copolymer, an ethylene/methacrylic acid copolymer, a metal salt (e.g., potasium, sodium or zinc salt) of an ethylene/methacrylic acid copolymer, and mixtures of any of these copolymers.

The ethylene copolymer (A-1) used in this invention should have a melt index (g/10 min.), measured in accordance with ASTM D-1238-65T, of 1 to 50, preferably 5 to 25, more preferably 5 to 20. If the melt index is too small, the melt flow of the copolymer is poor, and a coated film having good smoothness is difficult to form. If the melt index is too large, the smoothness of the coated film increases, but its strength and stress cracking resistance are reduced. Hence, the melt index of the copolymer (A-1) should be within the above-specified range. Preferably, the ethylene copolymer (A-1) is easy to powderize, and has also resistance to blocking. For this purpose, copolymers (A-1) having a density, measured by ASTM D-1505-67, of 0.91 to 0.97 $g/cm^3$, especially 0.92 to 0.95 $g/cm^3$, are suitable.

The grafting unsaturated carboxylic component in the graft copolymer of polyethylene (A-2) used in this invention includes, for example, unsaturated carboxylic acids and functional derivatives thereof.

Examples of the unsaturated carboxylic acids are those having 2 to 20 carbon atoms such as acrylic acid, methacrylic acid, maleic acid, fumaric acid and itaconic acid. The functional derivatives thereof include, for example, the anhydrides, ester derivatives, amide derivatives, imide derivatives, and metal salts (such as alkali metal salts) of unsaturated carboxylic acids. Specific examples of the functional groups are unsaturated carboxylic acid anhydrides such as maleic anhydride, citraconic anhydride, and itaconic anhydride; $C_1$–$C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, clycidyl acrylate, glycidyl methacrylate, monoethyl maleate, diethyl maleate, monomethyl fumarate, dimethyl fumarate, monomethyl itaconate, and diethyl itaconate; amide derivatives of unsaturated carboxylic acids such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate and potassium methacrylate. Of these, maleic anhydride is preferred.

The graft copolymer (A-2) can be produced by various known methods disclosed, for example, in U.S. Pat. Nos. 3,450,560, 3,290,415, 2,973,344, 3,928,497, 3,862,265 and 3,166,607. For example, it can be produced by the grafting reaction of polyethylene with the grafting monomer exemplified hereinabove, in the presence or absence of a solvent in the presence or absence of a radical initiator. Examples of the solvent are aromatic hydrocarbons such as benzene, toluene, xylene or chlorobenzene, and examples of the radical initiator are cumene hydroperoxide, dibenzoyl peroxide, dicumyl peroxide, ditert.butyl peroxide, tert.butyl hydroperoxide and azobisisobutyronitrile. The reaction temperature is, for example, from about 80° C. to about 180° C. Graft copolymers obtained by performing the above reaction in the copresence of another vinyl monomer such as styrene can also be used.

The amount of the grafting monomer to be grafted to polyethylene can be selected properly, and is preferably 0.01 to 20% by weight, more preferably about 0.1 to about 10% by weight, based on the weight of the graft copolymer (A-2) so as to increase the adhesion of the resulting coated film to a metal substrate and the melt flow of the resulting powder coating composition.

The amount of the graft copolymer (A-2) in the ethylene resin mixture (A) is such that the amount of the grafting monomer (unsaturated carboxylic component) becomes 0.001 to 2%, preferably 0.01 to 0.1%. If the amount of the graft copolymer (A-2) is less than the above-specified amount, the improvement of the adhesion of the coated film to a metal substrate is insufficient. If it is larger than the specified limit, the melt flow of the powder coating composition decreases. Accordingly, the graft copolymer (A-2) should desirably be used in the specified amount.

Examples of the hydrocarbon wax (B) as the other constituent of the powder coating composition of this invention are paraffin wax, microcrystalline wax, polyethylene wax, polypropylene wax and Fischer-Toropsch synthetic wax. Of these, the polyethylene wax is especially preferred because it has good compatibility with the ethylene resin mixture (A) and does not adversely affect the strength of the resulting coated film. These hydrocarbon waxes can be used singly or as a mixture of two or more.

The hydrocarbon wax (B) used in this invention would have a number average molecular weight of about 400 to about 3,000, preferably about 700 to about 2,500, more preferably about 700 to about 2,000, and a density of at least 0.9 $g/cm^3$, preferably 0.92 to 0.95.

Hydrocarbon waxes having an average molecular weight of less than 400 have a low melting point, and therefore, cause a trouble to the powderization of the resulting composition. On the other hand, waxes having a number average molecular weight of more than 3,000 give coated films having very poor stress cracking resistance as shown in Comparative Example 2 and 3 below. The hydrocarbon may be modified by oxidation, or graft-modified with an unsaturated carboxylic acid or its derivative, but the extent of modification should be very small. Interestingly, the use of a hydrocarbon wax modified by oxidation or modified with an unsaturated carboxylic acid or its derivative such as maleic anhydride increases stress cracking resistance to a greater extent than does an unmodified wax. However, as will be shown in Comparative Examples 4 and 5, adhesion to substrates is greatly impaired. Accordingly, when such a modified hydrocarbon wax is to be used as the wax (B), it should have an acid value of not more than 5, preferably not more than 2.

The number average molecular weight (Mn) of the hydrocarbon wax used in this invention is measured by a boiling point raising method using a toluene solution of a sample. The measurement was made by means of ebulliometer L-4 type (a device constant $K' = 3.33 \times 10^{-3}$; a product of Takara Kogyo Kabushiki Kaisha).

The acid value of the hydrocarbon is measured by a potassium hydroxide neutralizing method. Specifically, one gram of a sample is dissolved in 50 ml of an aromatic hydrocarbon solvent (Mitsui Solvent Special, a trademark for Mitsui Petrochemical Industries, ltd.; n.p. 163°–178° C., sp. gr. 0.88). The solution is neutralized with a 0.1 N KOH ethanol solution using phenolphthalein as an indicator. The acid value is defined as the number of milligrams of KOH required for neutralize the solution described above.

In the powder coating composition, 70 to 97% by weight of the ethylene resin mixture (A) and 3 to 30% by weight of the hydrocarbon wax (B) are used. Preferably, 75 to 95% by weight of the resin mixture (A) and 5 to 25% by weight of (B) are used. More preferably 80 to 90% by weight of (A) and 10 to 20% by weight of (B) are used. If the amount of (B) is too small, no satisfactory improving effect can be obtained, and pinholes tend to occur in the resulting coated film. If the amount (B) is too large, the adhesion to metal substrates is decreased. Thus, it is desirable to utilize the quantitative ratio within the above specified range because the intimate adhesion to metal substrates becomes poor.

In addition to the ethylene resin mixture (A) and the hydrocarbon wax (B), the powder compositions of this invention may further contain additives. Examples of the additives are weatherability stabilizers such as 2,2,4-trimethylhydroquinone, n-octadecyl-β-(4'-hydroxy-3',5'-ditert.butyl phenyl) propionate, tetrakis[methylene(3,5-ditert.butyl-4-hydroxy-hydrocinnamate)]-butane, and 4,4'-thiobis(6-tert.butyl-m-cresol); lubricants such as calcium stearate and stearic acid monoglyceride; antistatic agents such as pentaerithritol monostearate, sorbitan monopalmitate, sulfated oleic acid, and lauryl trimethylammonium chloride; coloring agents such as carbon black, titanium oxide, zinc oxide, cadmium red, ultramarine, copper phthalocyanine type pigments, quinacridone type pigments, and azo type pigments; nucleating agents such as sodium benzoate; fire retardants such as antimony oxide, tricresyl phosphate, tris-chloroethyl phosphate, tris-dichloropropyl phosphate, tetrabromoethane, and dibromodichloropropane; antioxidants such as 1,1,3-tris(5-tert.butyl-4-hydroxy-2-methylphenyl) butane, 2,2'-methylene-bis(4-ethyl-6-tert.butyl phenol) and 2,6-di-tert.butyl-p-cresol; and fillers such as asbestos, talc, glass powder, glass beads, clay, mica, diatomaceous earth, silica, calcium carbonate, calcium sulfate, and barium sulfate, and flowability improving agents such as magnesium oxide and finely divided silica (for good properties of these powders in a fluidized bed or in transportation lines).

The amounts of these additives can be varied according to the type of the additives and to the purposes of using them. For example, the amounts are about 0.01 to about 5 parts by weight, per 100 parts by weight of the sum of (A) and (B) for weatherability stabilizers, lubricants, antistatic agents, coloring agents, nucleating agents, fire retardants, antioxidants and flowability improving agents; and 1 to 50 parts by weight for fillers.

The powder coating composition of this invention can be provided by mixing the resins (A-1), (A-2) and (B), and optionally the aforesaid additives and making the mixture into a powder form. For example, this can be achieved by a method which comprises mixing these components by using a suitable mixing means such as a Henschel mixer, a tumbler blender or a ribbon blender, kneading the mixture in a melt blending means such as a kneader, an extruder, a Banbury mixer or a mixing roll, pelletizing the mixture, and pulverizing the pellets in a grinder; or by a method which comprises spraying a melt or solvent dispersion of these components into a medium of a cold gas to render the mixture into a powder; or by a method which comprises preparing an aqueous dispersion of the above components in a customary manner, and drying the dispersion at a low temperature; or by a method which comprises dispersing the above components in a good solvent, mixing them uniformly, then gradually adding a poor solvent to precipitate the composition in the form of a powder.

The powder coating composition of this invention is a solid powder form with an average particle diameter of about 20 to about 300 microns, preferably about 50 to about 200 microns.

The powder coating composition of this invention is used to form a coated film on metallic substrates by powder coating. Techniques for forming such a coated film are well known, and include, for example, fluidized bed coating, electrostatic spraying, electrostatic fluidized bed coating.

The following Examples and Comparative Examples illustrate the present invention in greater detail. Smoothness, adhesion and stress cracking resistance of a coated film in these examples were measured by the following methods.

SMOOTHNESS

A tin-free steel test plate, 50 mm × 150 mm × 0.8 mm, (a product of Nippon Test Panel Co., Ltd.) was coated with a sample powder coating composition by means of an electrostatic powder coating device at a voltage of 60 KV and a current of 150 microamperes with the primary pneumatic pressure of the spray gun set at 0.5 kg/cm$^2$ and the secondary pneumatic pressure of the spray gun at 2 kg/cm$^2$ so that the amount of the powder deposited per test panel became 4.0 to 4.5 g. The coated test panel was maintained at 170° C., and heated for 20 minutes in an electric furnace to subject it to a melting treatment. The smoothness of the coated film obtained by the melting treatment was evaluated by the naked eye on the following scale.

Class 1: excellent appearance substantially free from cratering
Class 2: good appearance with very slight cratering
Class 3: unneglible cratering formed
Class 4: bad appearance with cratering

ADHESION

Using the same test specimen as used for the evaluation of smoothness, the adhesion is expressed by the peel strength required for peeling off a coated film with a width of 1 cm from a steel test plate when the coated film was peeled off at an angle of 90 degrees and a speed of 50 mm/min. by using an Instron Tester.

STRESS CRACKING RESISTANCE

A press-formed sheet of the powder coating composition was tested in accordance with the method of ASTM D-1693-70, and F50 (the time which elapsed until 50% of the testing samples broke) was determined as a measure for the stress cracking resistance.

EXAMPLES 1 TO 3

Eighty-five parts by weight of an ethylene/propylene copolymer (propylene content: 5.3 wt.%) (to be referred to as EPC) having a melt index of 10.0 and a density of 0.925 g/cm$^3$, 5 parts by weight of a graft copolymer (to be referred to as MAHPE) obtained by grafting 2.5% by weight of maleic anhydride to polyethylene, and 10 parts by weight of each of the polyethylene waxes (to be referred to as PE waxes) A, B and C indicated in Table 1 were blended, and kneaded in an extruder at a resin temperature of 220° C. to pelletize the mixture. The amount of the maleic anhydride component was 0.14% by weight based on the weight of the mixture of EPC and MAHPE.

The pellets were mixed with liquid nitrogen, and pulverized in the frozen state by means of a hammer mill. The resulting powder was sieved through a 60-mesh screen, and those particles which passed through the sieve were collected to obtain the desired powders. These powders were tested, and the results are shown in Table 2.

COMPARATIVE EXAMPLE 1

A powder composition consisting of 95 parts by weight of EPC used in Example 1 and 5 parts by weight of MAHPE used in Example 1 was prepared in the same way as in Example 1 except that the PE wax was not added. The resulting powder composition was evaluated in the same way and the results are shown in Table 2.

COMPARATIVE EXAMPLES 2 AND 3

The procedure of Examples 1 to 3 was repeated except that waxes D and E indicated in Table 1 (outside the scope of the invention) were each used. The results are also shown in Table 2.

TABLE 1

| Hydrocarbon wax | Number average molecular weight | Density (g/cm$^3$) |
|---|---|---|
| A | 930 | 0.92 |
| B | 1200 | 0.97 |
| C | 2400 | 0.97 |
| D | 4000 | 0.92 |
| E | 4800 | 0.90 |

TABLE 2

| | Example | Example 1 | Example 2 | Example 3 | Comparative Example 1 | Comparative Example 2 | Comparative Example 3 |
|---|---|---|---|---|---|---|---|
| Composition (parts by weight) | EPC (A-1) | 85 | 85 | 85 | 95 | 85 | 85 |
| | MAHPE (A-2) | 5 | 5 | 5 | 5 | 5 | 5 |
| | Wax A (B) | 10 | | | | | |
| | Wax B (B) | | 10 | | | | |
| | Wax C (B) | | | 10 | | | |
| | Wax D (B)' | | | | | 10 | |
| | Wax E (B)' | | | | | | 10 |
| | Amount (wt. %) of the carboxylic component in (A-1) + (A-2) | 0.14 | 0.14 | 0.14 | 0.14 | 0.14 | 0.14 |
| Evaluation | Melt index (g/10 min.) | 12.0 | 12.4 | 11.9 | 8.2 | 11.1 | 11.2 |
| | Adhesion (kg/cm) | 7.8 | 5.8 | 5.5 | 9.1 | 7.6 | 8.2 |
| | Stress cracking resistance (F50; hours) | >600 | 400 | 130 | 600 | 60 | 20 |
| | Smoothness | Class 1 to class 2 | Class 1 | Class 1 | Class 4 | Class 2 to class 3 | Class 2 to class 3 |

EXAMPLES 4 TO 6 AND COMPARATIVE EXAMPLES 4 AND 5

The procedure of Example 1 was repeated except that each of the modified polyethylene waxes shown in Table 3 was used as the PE wax.

The results of evaluations in Examples 4 to 6 and Comparative Examples 4 and 5 are shown in Table 4.

TABLE 3

| Hydrocarbon wax | Number average molecular weight | Density (g/cm$^3$) | Modifying method of hydrocarbon wax | Acid value |
|---|---|---|---|---|
| F | 1200 | 0.92 | Oxidation | 1.5 |
| G | 1800 | 0.92 | Oxidation | 1.0 |
| H | 2400 | 0.92 | Oxidation | 1.0 |
| K | 1300 | 0.965 | Grafting of maleic anhydride | 30 |
| L | 1750 | 0.945 | Oxidation | 16 |

TABLE 4

| | Example | Example 4 | Example 5 | Example 6 | Comparative Example 4 | Comparative Example 5 |
|---|---|---|---|---|---|---|
| Composition (parts by weight) | EPC (A-1) | 85 | 85 | 85 | 85 | 85 |
| | MAHPE (A-2) | 5 | 5 | 5 | 5 | 5 |
| | WAX F (B) | 10 | | | | |
| | WAX G (B) | | 10 | | | |
| | WAX H (B) | | | 10 | | |
| | WAX K (B)' | | | | 10 | |
| | WAX L (B)' | | | | | 10 |
| | Amount (wt. %) of the carboxylic component | 0.14 | 0.14 | 0.14 | 0.14 | 0.14 |

TABLE 4-continued

| Example | Example 4 | Example 5 | Example 6 | Comparative Example 4 | Comparative Example 5 |
|---|---|---|---|---|---|
| Evaluation in (A-1) + (A-2) | | | | | |
| Melt index (g/10 min.) | 11.2 | 11.2 | 11.0 | 9.1 | 12.8 |
| Adhesion (kg/cm) | 6.4 | 6.4 | 4.7 | 0.6 | 0.8 |
| Stress cracking resistance (F50: hours) | 600 | 380 | 330 | >600 | >600 |
| Smoothness | Class 2 | Class 2 | Class 2 | Class 2 | Class 1 |

EXAMPLES 7 TO 10

The procedure of Example 1 was repeated except that the amounts of EPC, MAHPE and wax A used in Example 1 were changed as shown in Table 5.

The results of evaluation of Examples 7 to 10 are shown in Table 5.

COMPARATIVE EXAMPLE 6

The procedure of Example 1 was repeated except that a composition composed of 95 parts by weight of low-density polyethylene (to be abbreviated as LDPE) having a melt index of 70 and a density of 0.915 g/cm³ and 5 parts by weight of MAHPE used in Example 1 and containing no hydrocarbon wax was used.

TABLE 5

| | Example | 7 | 8 | 9 | 10 |
|---|---|---|---|---|---|
| Composition (parts by weight) | EPC (A-1) | 90 | 85 | 80 | 75 |
| | MAHPE (A-2) | 5 | 5 | 5 | 5 |
| | Wax A (B) | 5 | 10 | 15 | 20 |
| | Amount of the carboxylic component (wt. %) in (A-1) + (A-2) | 0.13 | 0.14 | 0.15 | 0.16 |
| Evaluation | Melt index (g/10 min.) | 10.1 | 11.4 | 15.1 | 16.3 |
| | Adhesion (kg/cm) | 9.2 | 7.8 | 6.3 | 4.7 |
| | Stress cracking resistance (F50) | >600 | >600 | >600 | >600 |
| | Smoothness | Class 2 | Class 1 to class 2 | Class 1 | Class 1 |

EXAMPLE 11

The procedure of Example 1 was repeated except that a composition composed of 65 parts by weight of EPC, 5 parts by weight of MAHPE, 10 parts of wax A and 20 parts by weight of an ethylene/vinyl acetate copolymer (to be abbreviated as EVA) having a melt index of 15 and a vinyl acetate content of 28% by weight as used.

EXAMPLE 12

The procedure of Example 11 was repeated except that an ethylene/1-butene copolymer (to be abbreviated as EBC) having a melt index of 20, an ethylene content of 92 mole% and a density of 0.90 g/cm³ was used instead of EVA.

COMPARATIVE EXAMPLE 7

The procedure of Example 1 was repeated except that a composition composed of 65 parts by weight of LDPE used in Comparative Example 6, 30 parts by weight of EBC used in Example 12 and 5 parts by weight of MAHPE used in Example 1 and containing no hydrocarbon wax was used.

COMPARATIVE EXAMPLE 8

The procedure of Example 1 was repeated except that a composition composed of 94 parts by weight of EPC used in Example 1, 5 parts by weight of MAHPE and 1 part by weight of zinc stearate (to be abbreviated as StZn) and containing no hydrocarbon wax was used.

The results of evaluations in Examples 11 and 12 and Comparative Examples 6 to 8 are shown in Table 6.

TABLE 6

| | Example | Example 11 | Example 12 | Comparative Example 6 | Comparative Example 7 | Comparative Example 8 |
|---|---|---|---|---|---|---|
| Composition (parts by weight) | EPC (A-1) | 65 | 65 | | | 94 |
| | EVA (A-1) | 20 | | | | |
| | EBC (A-1) | | 20 | | 30 | |
| | LDPE | | | 95 | 65 | |
| | MAHPE (A-2) | 5 | 5 | 5 | 5 | 5 |
| | Wax (B) | 10 | 10 | | | |
| | StZn | | | | | 1 |
| | Amount (wt. %) of the carboxylic component in (A-1) + (A-2) | 0.14 | 0.14 | (0.125) | (0.125) | (0.126) |
| Evaluation | Melt index (g/10 min.) | 12.8 | 14.5 | 6.6 | 15.4 | 9.4 |
| | Adhesion (kg/cm) | 7.2 | 5.8 | 2.4 | 5.7 | 0 |
| | Stress cracking resistance (F50; hours) | >600 | >600 | 2 | 0 | 150 |
| | Smoothness | Class 1 to | Class 1 | Class 1 | Class 1 | Class 3 to |

TABLE 6-continued

| Example | Example 11 | Example 12 | Comparative Example 6 | Comparative Example 7 | Comparative Example 8 |
|---|---|---|---|---|---|
| | class 2 | | | class 4 | |

What we claim is:

1. A powder coating composition comprising
(A) 70 to 97% by weight of an ethylene resin mixture composed of
  (A-1) an ethylene copolymer having an ethylene content of at least 70 mole percent ethylene, a melt index of 1 to 50 and containing at least one comonomer selected from the group consisting of alpha-olefins other than ethylene, dienes, vinyl acetate, vinyl alcohol, acrylic acid, methacrylic acid and functional derivatives of methacrylic acid, and
  (A-2) a graft copolymer of polyethylene having grafted thereto an unsaturated carboxylic component, the amount of said unsaturated carboxylic component being 0.001 to 2% based on the weight of the ethylene resin mixture (A), and
(B) 3 to 30% by weight of a hydrocarbon wax having a number average molecular weight of about 400 to about 3,000 and a density of not less than 0.9 g/cm$^3$, said wax having an acid value of up to about 5 when modified by oxidation or graft-modified.

2. The composition of claim 1 wherein the amount of the ethylene resin mixture is 75 to 95% by weight, and the amount of the hydrocarbon wax (B) is 5 to 25% by weight.

3. The composition of claim 1 wherein the ethylene copolymer (A-1) has a melt index of 5 to 25.

4. The composition of claim 1 wherein the ethylene copolymer (A-1) consists of a minor proportion of at least one comonomer selected from the group consisting of alpha-olefins having 3 to 10 carbon atoms and vinyl acetate.

5. The composition of claim 1 wherein the carboxylic component of the graft copolymer (A-2) in maleic acid or maleic anhydride.

6. The composition of claim 1 wherein the number average molecular weight of the hydrocarbon wax (B) is about 700 to about 2,500.

7. The composition of claim 1 wherein the hydrocarbon wax (B) is a polyethylene wax or a modified polyethylene wax.

8. The composition of claim 1 wherein the average particle diameter of the powder coating composition is from about 20 microns to about 300 microns.

* * * * *